(12) United States Patent
George et al.

(10) Patent No.: US 7,792,651 B2
(45) Date of Patent: Sep. 7, 2010

(54) METHODS AND SYSTEMS FOR COMPUTING GEAR MODIFICATIONS

(75) Inventors: Sheri George, Karnataka (IN); Sivaramanivas Ramaswamy, Karnataka (IN); Kongasary Krishnan Kutty, Andhra Pradesh (IN); Abhinav Ramnath Bajpai, Erie, PA (US)

(73) Assignee: General Electric Company, Schenectady, NY (US)

( * ) Notice: Subject to any disclaimer, the term of this patent is extended or adjusted under 35 U.S.C. 154(b) by 744 days.

(21) Appl. No.: 11/796,051

(22) Filed: Apr. 26, 2007

(65) Prior Publication Data

US 2008/0270070 A1 Oct. 30, 2008

(51) Int. Cl.
*G01N 37/00* (2006.01)
(52) U.S. Cl. .................................................. 702/82
(58) Field of Classification Search .................. 702/82, 702/167; 328/141, 100; 454/229, 454
See application file for complete search history.

(56) References Cited

U.S. PATENT DOCUMENTS

| | | |
|---|---|---|
| 3,849,892 A | 11/1974 | Fabish et al. |
| 3,950,858 A | 4/1976 | Donner et al. |
| 4,276,700 A | 7/1981 | Tanno et al. |
| 4,285,133 A | 8/1981 | Sterki et al. |
| 4,297,788 A | 11/1981 | Sterki et al. |
| 4,322,889 A | 4/1982 | Guenter |
| 4,337,580 A | 7/1982 | Tanno et al. |
| 4,368,522 A | 1/1983 | Spath et al. |
| 4,373,268 A | 2/1983 | Spaeth |
| 5,287,293 A | 2/1994 | Chen et al. |
| 5,978,500 A * | 11/1999 | Broughton ................. 382/141 |
| 6,955,100 B1 | 10/2005 | Barich et al. |
| 2003/0096572 A1* | 5/2003 | Gutta et al. ................. 454/229 |
| 2008/0226122 A1* | 9/2008 | Thompson et al. .......... 382/100 |

\* cited by examiner

*Primary Examiner*—Tung S Lau
*Assistant Examiner*—Xiuquin Sun
(74) *Attorney, Agent, or Firm*—John A. Kramer, Esq.; Armstrong Teasdale LLP

(57) ABSTRACT

A method of computing gear modifications from a gear inspection chart is provided. The method includes extracting a gear profile from the gear inspection chart. The method also includes quantifying the gear profile. The method also includes determining a gear modification based on a quantified gear profile. The method also includes qualifying a gear based on the gear modification.

20 Claims, 5 Drawing Sheets

METHODS AND SYSTEMS FOR COMPUTING GEAR MODIFICATIONS

BACKGROUND OF THE INVENTION

This invention relates generally to gear inspection, and more specifically to methods and systems for computing gear modifications from a gear inspection chart.

Gears assembled for gearboxes are inspected prior to being installed in a gearbox. Generally, the gears are inspected to facilitate reducing the likelihood and amount of noise and vibration within the gearbox during operation. Specifically, to ensure a proper amount of contact between mating gears, the gears are typically modified to deviate from an ideal involute gear profile. More specifically, known gears are often modified within an upper control limit and a lower control limit to improve the contact area defined between adjacent gears. Adjusting the contact area between mating gears facilitates reducing noise and vibration during gearbox operation. Accordingly, the gear modifications generally facilitate improving a life-span of the gears and/or reducing gear maintenance. As such, during the inspection process, gear profiles that exceed either an upper control limit or a lower control limit are generally determined to be unusable within the gearbox.

At least one known method of inspecting a gear is to use a K-chart. A distinct K-chart exists for each type of gear manufactured. The K-chart provides an upper control limit and a lower control limit that corresponds to the type of gear. Typically, a K-chart is overlaid on the gear profile such that the gear profile may be analyzed with respect to the K-chart. The gear profile is then manually inspected to ensure that the profile falls within the upper and lower control limits of the K-chart. However, manual inspection using a K-chart may be both time consuming and subject to inspector errors. Furthermore, known K-chart inspections do not provide a quantified analysis of gear profile deviations. As such, although the K-chart is useful in verifying conformity between the gear profile and the modification limits, known K-chart inspections do not provide a quantified assessment that may be used to correct gear modifications during manufacturing. The lack of a quantitative gear profile assessment may limit an analysis of probable noise and vibration during gearbox operation.

BRIEF DESCRIPTION OF THE INVENTION

In one embodiment, a method of computing gear modifications is provided. The method includes extracting a gear profile from a gear inspection chart associated with a gear being inspected, calibrating the gear inspection chart to quantify the gear profile, determining a gear modification based on a quantified gear profile, and determining if the gear is useable based on the gear modification.

In another embodiment, a system for computing gear modifications is provided. The system includes a processor configured to extract a gear profile from a gear inspection chart associated with a gear being inspected, calibrate the gear inspection chart to quantify the gear profile, determine a gear modification based on a quantified gear profile, and determine if the gear is useable based on the gear modification.

In yet another embodiment, a computer program embodied on a computer-readable medium for computing gear modifications is provided. The computer program includes a code segment configured to extract a gear profile from a gear inspection chart associated with a gear being inspected, calibrate the gear inspection chart to quantify the gear profile, determine a gear modification based on a quantified gear profile, and determine if the gear is useable based on the gear modification.

DETAILED DESCRIPTION OF THE INVENTION

The present invention provides a system for qualifying a gear based on a gear modification computed from a gear inspection chart. The system includes a processor that is programmed to extract a gear profile from the gear inspection chart. The processor is also programmed to quantify the gear profile, compute a gear profile and lead modifications, and determine whether the modifications are within predetermined limits, thus aiding in acceptance or rejection of the gear. Further, the present invention provides a computer program embodied on a computer-readable medium for qualifying a gear based on a gear modification computed from a gear inspection chart. The computer program includes a code segment that is configured to extract a gear profile from the gear inspection chart, quantify the gear profile, compute a gear profile and lead modifications, and to determine whether the modifications are within the upper and lower specification limits to aid in acceptance or rejection of the gear.

Figure 1:
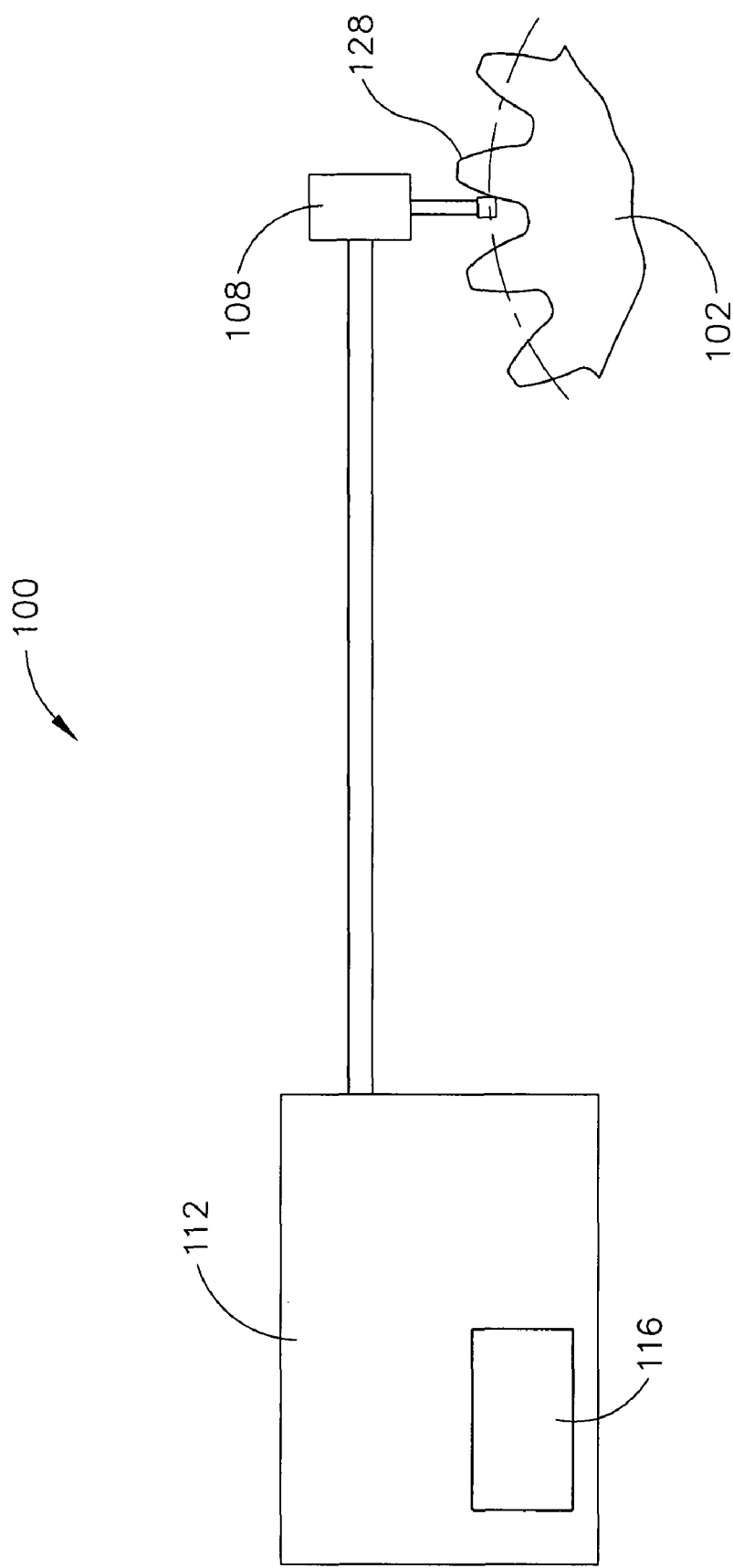
FIG. 1 is a schematic view of an exemplary system that may be used to compute gear modifications from a gear inspection chart.
Figure 2:
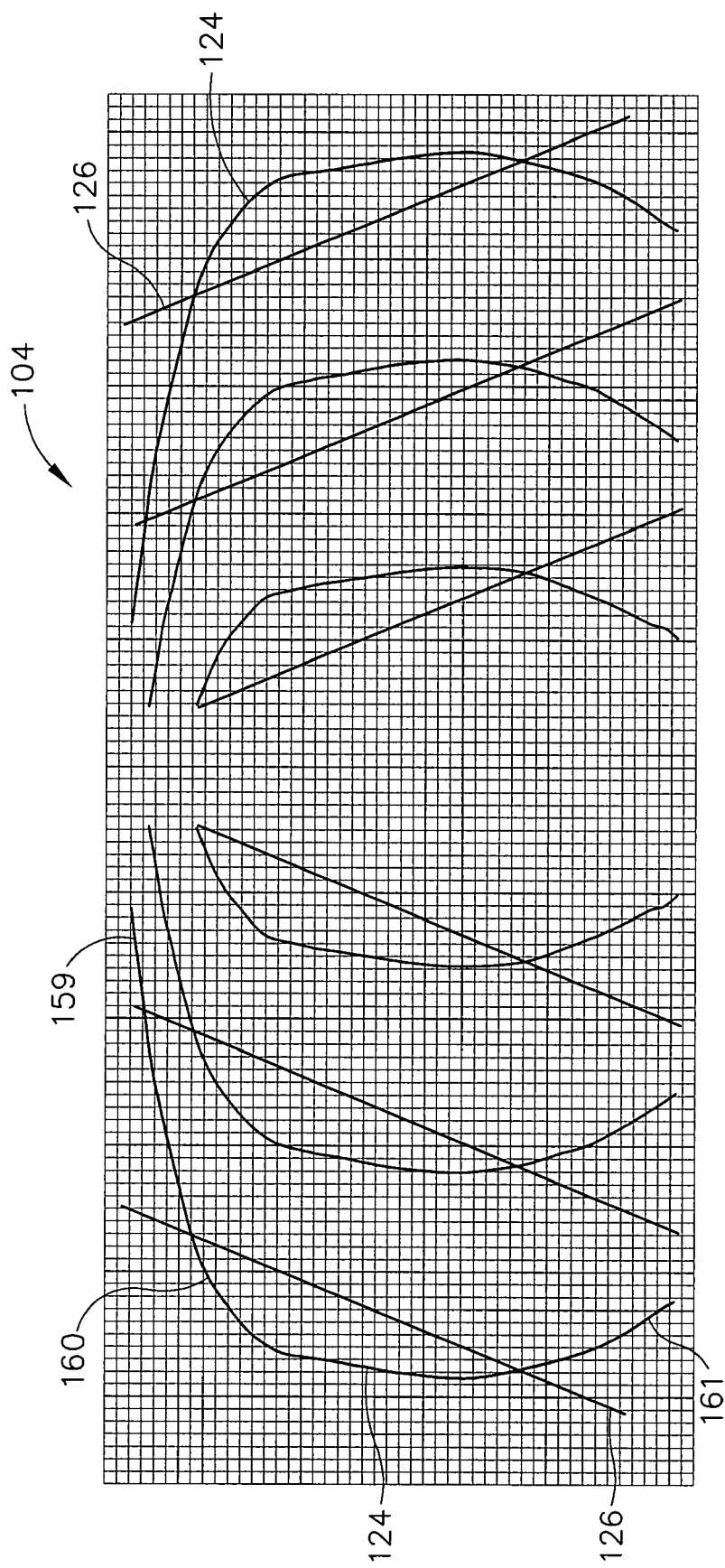
FIG. 2 is a view of an exemplary gear inspection chart that may be used with the system shown in FIG. 1.

FIG. 1 is a schematic view of an exemplary system 100 that may be used to qualify a gear 102 based on a gear modification computed from a gear inspection chart (not shown in FIG. 1). FIG. 2 is an exemplary view of a gear inspection chart 104. In the exemplary embodiment, system 100 includes a coordinate measuring machine 108 and a computer 112 including a processor 116. Coordinate measuring machine 108 is configured to measure the profiles of gear 102, such that gear inspection chart 104 may be generated, as shown in FIG. 2, from the measured profiles. In the exemplary embodiment, gear inspection chart 104 includes six profiles 124 and six limit lines 126. Alternatively, the number of profiles and the number of limit lines may vary based on the machine being inspected. Each profile 124 represents a measurement of a single tooth 128 on gear 102. Generally, an analysis of one profile 124 provides a fair indication of a profile for the entire gear 102.

Specifically, in the exemplary embodiment, at least one profile 124 is analyzed to ensure that the entire profile of gear 102 is within a predetermined profile range. More specifically, each gear 102 may be modified within an upper control limit and a lower control limit. Maintaining the overall gear profile within the upper and lower control limits facilitates optimizing the contact area between mating gear, which facilitates reducing noise and vibration levels during operation of an associated gearbox. Moreover, analysis of at least one profile 124 generally indicates whether the modifications to gear 102 are within the predetermined upper and lower control limits. Different types of charts are generated with varying background patterns based on a type of coordinate measuring machine that is used for inspection.

Accordingly, in the exemplary embodiment, gear inspection chart 104 is supplied to computer 112 for analysis of at least one profile 124. Processor 116 computes gear modifications from gear inspection chart 104 using the methods described in more detail below. Generally, processor 116 extracts a gear profile 124 from gear inspection chart 104, quantifies gear profile 124, and computes a gear modification, if necessary. In one embodiment, processor 116 includes a code segment that is configured to compute the gear modifications. In an alternative embodiment, the code segment is embodied on a computer readable medium, such as, but not limited to, a CD-ROM, a DVD-ROM, or any other suitable computer readable medium.

Figure 3:
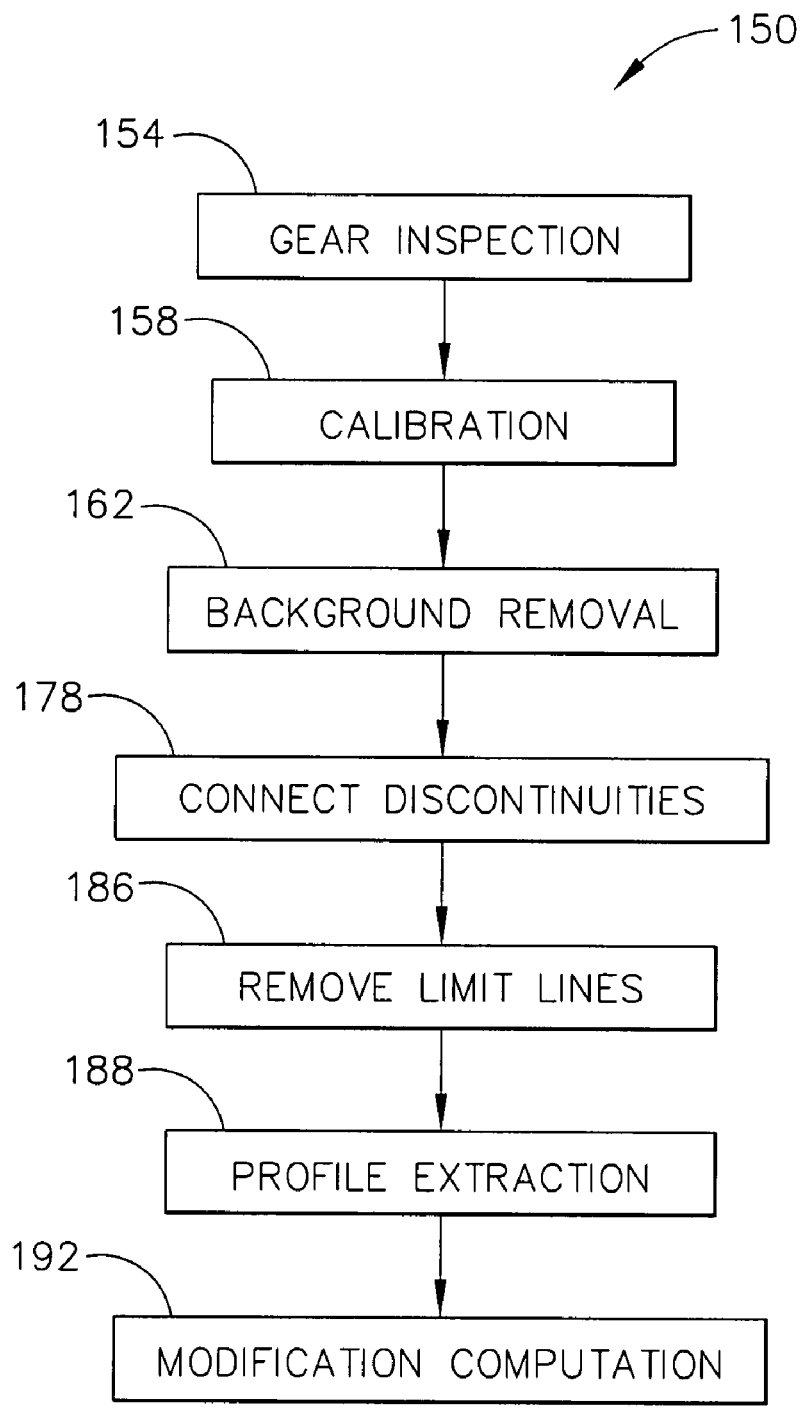
FIG. 3 is a flowchart illustrating an exemplary method of computing gear modifications from the gear inspection chart shown in FIG. 2.
Figure 4:
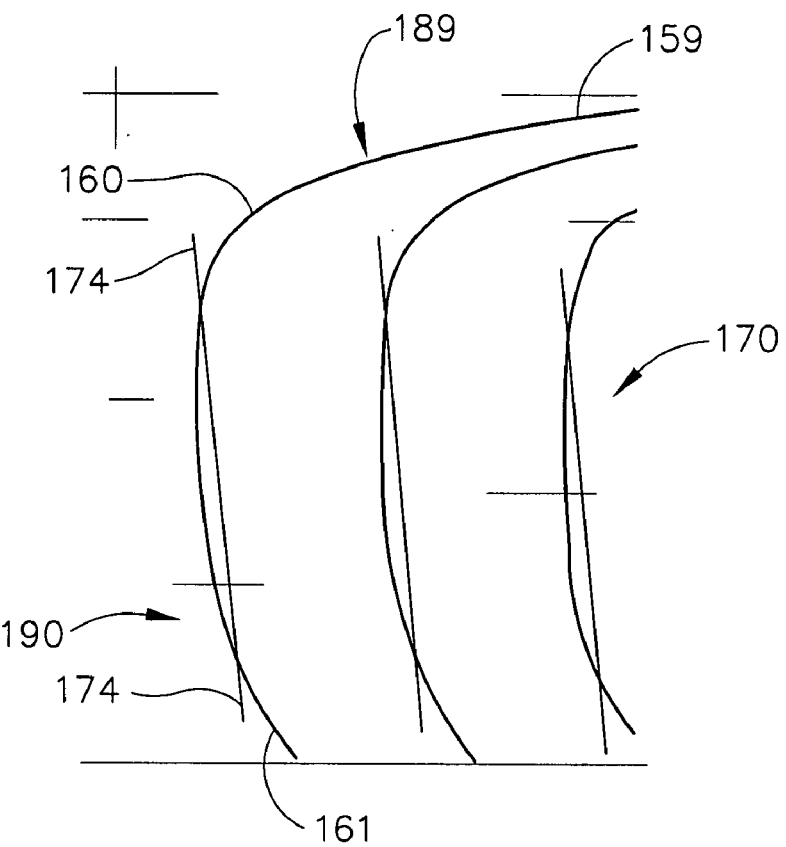
FIG. 4 is a view of the gear inspection chart shown in FIG. 2 with the background removed.
Figure 5:
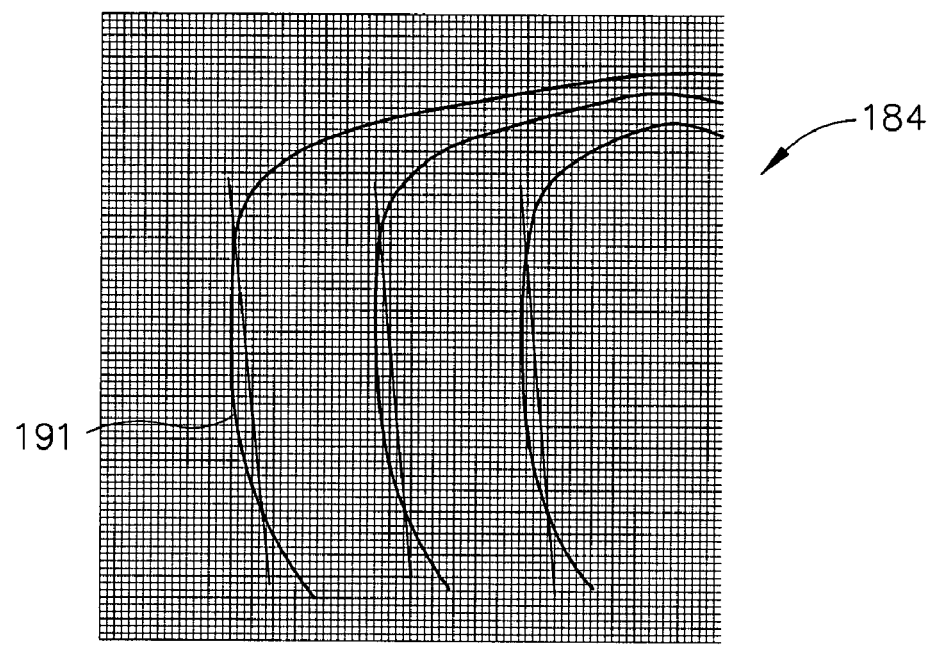
FIG. 5 is a view of an exemplary gear profile that has been extracted from the gear inspection chart shown in FIG. 2.
Figure 6:
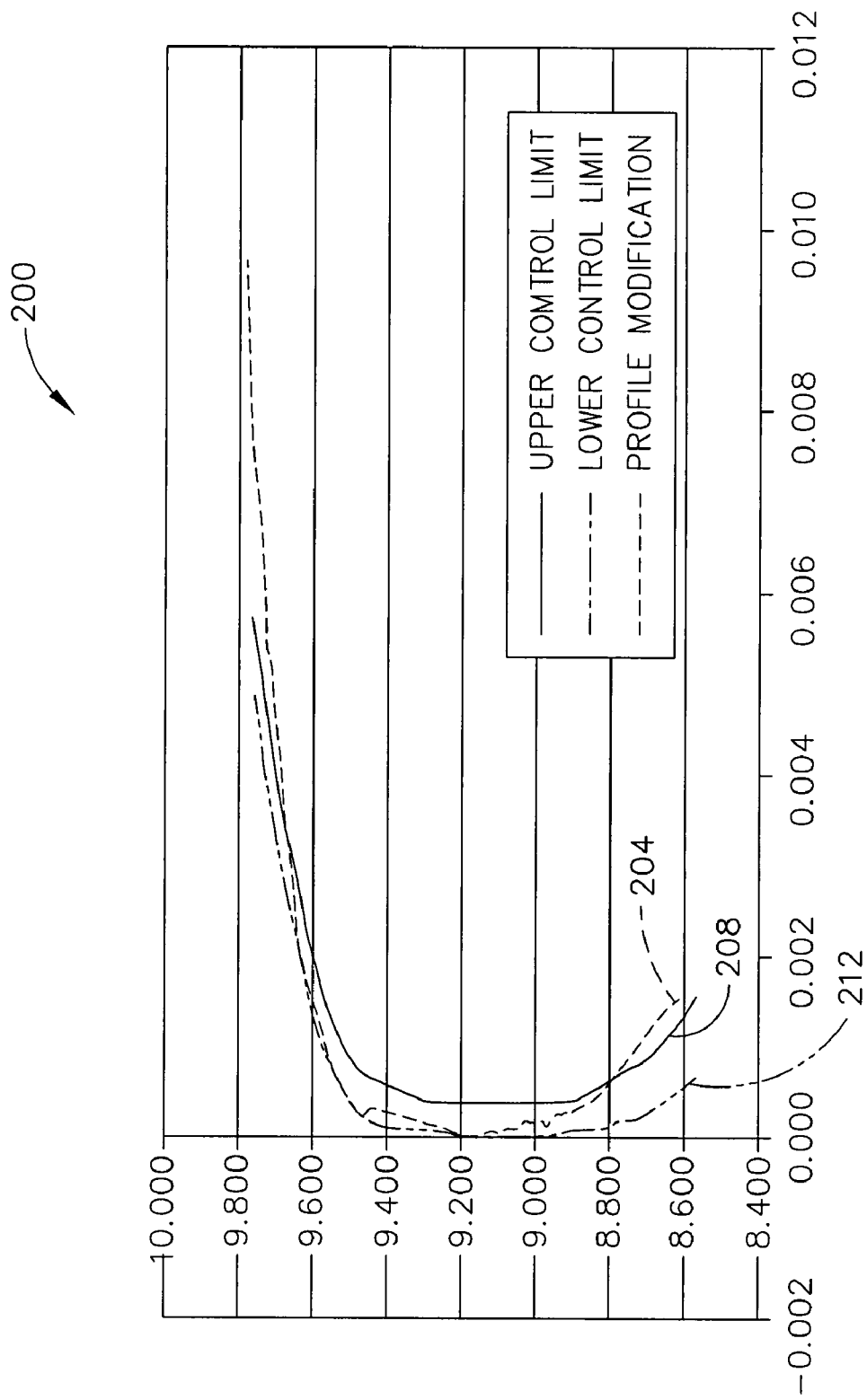
FIG. 6 is a view of an exemplary gear profile modification chart created from the gear inspection chart shown in FIG. 2.

FIG. 3 is a flowchart 150 of an exemplary method for computing gear profile modifications. In the exemplary embodiment, the method illustrated in FIG. 3 computes the gear profile modification with at least an approximate 95% accuracy. FIGS. 4, 5, and 6 illustrate exemplary profiles 124 developed throughout the steps of the method illustrated in flowchart 150. Specifically, FIG. 4 is a view of gear inspection chart 104 with the background removed, FIG. 5 is a view of an exemplary gear profile 124 that has been extracted from gear inspection chart 104, and FIG. 6 is a view of an exemplary gear profile modification chart 200 created from gear inspection chart 104. The method includes performing a gear inspection 154 using the coordinate measuring machine 108 (shown in FIG. 1). Specifically, gear 102 is rotated to enable coordinate measuring machine 108 to measure the profile of each tooth 128 to generate gear inspection chart 104.

Gear inspection chart 104 is then calibrated 158 to quantify profiles 124. Specifically, the profiles are converted from graphic space to real space by providing precise numerical measurements that correspond to each point on the profile. In the exemplary embodiment, the conversion from the graphic axis to real space is performed by selecting two reference points, along with their values, in the graphic space in both the X and Y directions. A calibration factor is computed as the ratio of the distance in the graphic space to the real space. Using calibrated measurements, profiles 124 of the gear are quantified, such that profiles 124 can be numerically compared to pre-determined upper and lower control limits that are each defined during the gear design process.

During calibration 158, gear inspection chart 104 is displayed on a monitor coupled to computer 112. Using software on computer 112, at least three points on a profile 124 may be selected to enable the numerical measurements for each point on profile 124 to be determined. In the exemplary embodiment, the three points selected include an upper point 159, a lower point 160, and a knee point 161. Further, an operator can use computer 112 to enlarge a pre-selected portion of profile 124, such that points on the profile can be more precisely selected and to provide a more accurate numerical measurement for each point on profile 124. The calibration of the profile chart is described above. By converting from graphic space to real space, the process described herein is immune to the level of zoom. However, as described above, a larger zoom may assist the inspector during selection of the three points on the profile.

The background is then removed 162 from gear inspection chart 104. In the exemplary embodiment, a morphological operation combining the erosion and the dilation of opening is sequentially applied on the chart so that the horizontal and vertical lines are emphasized. The horizontal and vertical lines are subtracted from graph pattern and applied with median filtering to obtain a background-subtracted chart. In another embodiment, a morphological operation of opening is applied on the chart image. Skeletonizing is performed on the result to reduce the width of the profile to approximately one pixel. The resultant image is then inverted and applied with median filter to remove any isolated noise.

The above-described steps facilitate removing the vertical and horizontal lines that form the graph pattern on gear inspection chart 104. In one embodiment, the graph pattern is removed using a combination of erosion and dilation. In the exemplary embodiment, the filters utilized are at least one of linear filters, morphological filters, and/or a combination of linear and morphological filters. The background-removed image is used for further analysis. Removing the background 162 creates a profile chart 170 as is shown in FIG. 4. It should be noted that, in the exemplary embodiment, chart 170 includes only three of the profiles 124 that are illustrated in gear inspection chart 104. Specifically, for simplicity, chart 170 includes only the three leftmost profiles 124 that are illustrated in gear inspection chart 104. Alternatively, any or all of the profiles 124 may be extracted from gear inspection chart 104.

As illustrated in FIG. 4, after removing the graph pattern from gear inspection chart 104, the vertical and horizontal lines included in profile 124 are also removed, such that a plurality of discontinuities 174 remain in profile 124. The discontinuities are connected 178 together to form continuous profiles. Moreover, in the exemplary embodiment, limit lines 126 are removed 186 by selecting two points at an end of each line and removing the line extending between the two points. In the exemplary embodiment, the profile is extracted and reconstructed as two parts: a parabolic portion 189 and a circular portion 190. Parabolic portion 189 extracts and reconstructs a curve 191 from the upper selection 159 point to the knee point 160. Circular portion 190 extracts and reconstructs curve 191 from the knee point 160 to the lower selection point 161. In each portion a fixed-size, moving window is used to scan all points for adding the points to the reconstructed curve. A metric (slope/distance) is computed for each of the points within the window. The slope is computed with respect to the selected point from which curve 191 was extracted. The metric is compared with a reference value that is obtained by dividing the slope of the last grown point with respect to the selected point from which curve 191 was extracted. A point having the minimum difference is chosen and added to curve 191. To facilitate reducing discontinuities in curve 191, linear interpolation is performed between adjacent points. The circular and parabolic portions 189 and 190 of curve 191 are thus extracted, reconstructed, and appended together to obtain the profile or the lead curve 204. Accordingly, measurable profiles 124 having precisely measured points are enabled to be extracted 188 from gear inspection chart 104.

In the exemplary embodiment, a profile or lead modification is computed from the reconstructed curve 204 described above. A modification is defined and computed as the distance between a point on the profile and a point on curve 204 that is closest to the x-axis. Additionally, upper and lower limit curves 208 and 212 for profile or lead modification are generated based on gear nomenclature and the flank of the profile. In one embodiment, the profile and lead modifications are generated in one of the left and right flank of the profile. The upper and lower limits of the modifications are selected based on the functionality and operation of the gear 102. Accordingly, from chart 184, profile or lead 204 is extracted 188 and reconstructed. The modification is computed and overlaid with its upper and lower limits 208 and 212 as is shown in FIG. 6.

The gear modification chart 200 illustrated in FIG. 6 includes a gear modification profile 204, an upper control limit 208, and a lower control limit 212. Using chart 200, the profile of gear 102 can be quantitatively compared to ensure that the gear modifications 204 are within upper control limit 208 and lower control limit 212. Specifically, if the gear modifications fall outside of the limits, the gear may be deemed unacceptable for use in a gearbox. More specifically, gears that fall outside the limits may operate with an unacceptable noise and/or vibration level during operation of the gearbox. Accordingly, chart 200 provides a quantified assessment of the gear modification profile that is useful in the inspection of the gear. In the exemplary embodiment, the above-described system and methods compute the gear profile modification with approximately 95% accuracy.

Based on the quantified assessment, a gear 102 is either accepted or rejected for use in a gearbox. Moreover, chart 200 enables a manufacturer to check whether a manufacturing process operating efficiently based on the computed modification with respect to a desired gear profile, and if necessary, enable corrections to be made to the manufacturing process. Moreover, by quantifying the gear profile modification, and extracting the gear profile, a numerical simulation can be performed to determine an ideal gear profile modification for reducing noise and vibration in the gearbox.

In one embodiment, a method of computing gear modifications is provided. The method includes extracting a gear profile from a gear inspection chart associated with a gear being inspected, calibrating the gear inspection chart to quantify the gear profile, determining a gear modification based on a quantified gear profile, and determining if the gear is useable based on the gear modification. In the exemplary embodiment, the method includes removing a background from the gear inspection chart. In one embodiment, the method includes removing the background from the gear inspection chart using at least one of a morphological filter, a linear filter, a matched filter, and a non-linear filter. In another embodiment, the method includes connecting at least two edges of an image after the background has been removed. In a further embodiment, the method includes extracting the gear profile using sub-pixel edge extraction. In the exemplary embodiment, the method includes comparing the gear modification to an upper control limit and a lower control limit. In one embodiment, the method includes performing a gearbox vibration analysis using the gear modification.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

The above-described methods and systems facilitate providing a quantified gear profile modification. The methods and systems also enable qualification of a gear based on a gear modification computed from a gear inspection chart. Specifically, conformity of a gear profile with predetermined profile control limits can be calculated. More specifically, a gear profile modification is calculated with approximately 95% accuracy. As such, gear inspections can be performed more accurately and more quickly, in comparison to the known inspection methods. The above-described system and method also provides a quantified measurement that facilitates improved gear manufacturing. Further, the above-described system and method facilitate improved noise and vibration analysis in a gearbox. Accordingly, the above-described system and method facilitate reducing gear failures. As such, the above-described system and method facilitate increasing a gearbox life-span and reducing maintenance costs associated with a gearbox.

Exemplary embodiments of systems and methods for calculating gear modifications are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method of computing gear modifications, said method comprising:
   inspecting a gear using a coordinate measuring machine;
   generating a gear inspection chart associated with the inspected gear from the output of said coordinate measuring machine;
   extracting a gear profile from the gear inspection chart, wherein said profile represents a measurement of a single tooth on the gear;
   calibrating the gear inspection chart to quantify the gear profile, wherein said calibrating comprises converting the gear profile from a graphic space to a real physical space which surrounds the gear under inspection;
   determining a gear modification based on the quantified gear profile, wherein said gear modification comprises an adjustment of a contact area of the gear; and
   determining if the gear is useable based on the gear modification.

2. A method in accordance with claim 1 wherein extracting a gear profile further comprises removing a background from the gear inspection chart.

3. A method in accordance with claim 2 further comprising removing the background from the gear inspection chart using at least one of a morphological filter, a linear filter, a matched filter, and a non-linear filter.

4. A method in accordance with claim 2 wherein extracting a gear profile further comprises connecting at least two edges of an image after the background has been removed.

5. A method in accordance with claim 1 further comprising extracting the gear profile using sub-pixel edge extraction.

6. A method in accordance with claim 1 further comprising comparing the gear modification to an upper control limit and a lower control limit.

7. A method in accordance with claim 1 further comprising performing a gearbox vibration analysis using the gear modification.

8. A system for computing gear modifications, said system comprising a processor configured to:
   inspect a gear using a coordinate measuring machine;
   generate a gear inspection chart associated with the inspected gear from the output of said coordinate measuring machine;
   extract a gear profile from the gear inspection chart, wherein said profile represents a measurement of a single tooth on the gear;

calibrate the gear inspection chart by converting the gear profile from a graphic space to a real physical space which surrounds the gear under inspection to quantify the gear profile;

determine a gear modification based on the quantified gear profile, wherein the gear modification comprises an adjustment of a contact area of the gear; and determine if the gear is useable based on the gear modification.

9. A system in accordance with claim 8 wherein said processor is further configured to extract the gear profile by removing a background from the gear inspection chart.

10. A system in accordance with claim 9 wherein said processor is further configured to remove the background from the gear inspection chart using at least one of a morphological filter, a linear filter, a matched filter, and a non-linear filter.

11. A system in accordance with claim 9 wherein said processor is further configured to extract the gear profile by connecting at least two edges of an image after the background has been removed.

12. A system in accordance with claim 9 wherein said processor is further configured to generate a profile and lead modification in a right flank of the profile.

13. A system in accordance with claim 8 wherein said processor is further configured to compare the gear modification to an upper control limit and a lower control limit.

14. A system in accordance with claim 8 wherein said processor is further configured to perform a gearbox vibration analysis using the gear modification.

15. A computer program embodied on a computer-readable medium for computing gear modifications, said computer program comprising a code segment configured to:

inspect a gear using a coordinate measuring machine;

generate a gear inspection chart associated with the inspected gear from the output of said coordinate measuring machine;

extract a gear profile from the gear inspection chart, wherein said profile represents a measurement of a single tooth on the gear;

calibrate the gear inspection chart by converting the gear profile from a graphic space to a real physical space which surrounds the gear under inspection to quantify the gear profile;

determine a gear modification based on the quantified gear profile, wherein the gear modification comprises an adjustment of a contact area of the gear; and determine if the gear is useable based on the gear modification.

16. A computer program in accordance with claim 15, wherein said computer program further comprises a code segment configured to extract the gear profile by removing a background from the gear inspection chart.

17. A computer program in accordance with claim 16, wherein said computer program further comprises a code segment configured to remove the background from the gear inspection chart using at least one of a morphological filter, a linear filter, a matched filter, and a non-linear filter.

18. A computer program in accordance with claim 16, wherein said computer program further comprises a code segment configured to extract the gear profile by connecting at least two edges of an image after the background has been removed.

19. A computer program in accordance with claim 15, wherein said computer program further comprises a code segment configured to extract the gear profile using sub-pixel edge extraction.

20. A computer program in accordance with claim 15, wherein said computer program further comprises a code segment configured to compare the gear modification to an upper control limit and a lower control limit.

\* \* \* \* \*